United States Patent [19]
Tannenbaum et al.

[11] 3,720,585

[45] March 13, 1973

[54] PROCESS OF REDUCING THE NUCLEIC ACID CONTENT IN YEAST

[75] Inventors: Steven R. Tannenbaum, Framingham; Anthony J. Sinskey, Southbridge; Stephen B. Maul, Cambridge, all of Mass.

[73] Assignee: Massachusetts Institute of Technology, Cambridge, Mass.

[22] Filed: July 8, 1970

[21] Appl. No.: 53,263

[52] U.S. Cl..........................195/98, 195/28 N, 99/96
[51] Int. Cl..............................................C12c 11/00
[58] Field of Search..............................195/28 N, 98

[56] References Cited

UNITED STATES PATENTS

| | | | |
|---|---|---|---|
| 3,243,354 | 3/1966 | Nakao et al. | 195/28 N |
| 3,139,385 | 6/1964 | Ogata et al. | 195/28 N |

Primary Examiner—Alvin E. Tanenholtz
Attorney—Thomas Cooch, Richard F. Benway and Arthur A. Smith, Jr.

[57] ABSTRACT

A process performed upon yeast cells to produce inexpensive, palatable protein by first heat shocking at preselected temperatures, then incubating at other preselected temperatures, under controlled pH and for prescribed intervals of time.

9 Claims, 3 Drawing Figures

FIG. I

PROCESS OF REDUCING THE NUCLEIC ACID CONTENT IN YEAST

Two problems in yeast consumption in the past have been nucleic acid content and palatability. Nucleic acid is metabolized by human beings and breaks down to uric acid. Uric acid is a potential problem when large amounts of yeast are digested.

High uric acid content in the blood is associated with such diseases as gout, tophi and formation of uric acid stones in the urinary track. If single-cell protein such as yeast is to be used as a primary protein source for human populations, the nucleic acid content should be reduced to a level which would allow a maximum intake in the range of 2 grams of nucleic acid per day. Thus, by drastically reducing its nucleic acid content in accordance with the principles of the present invention, a previously well known protein source, yeast, which is inexpensive, becomes available for human consumption. Hence, the safety problem previously associated with yeast has, for all intents and purposes, been eliminated. Yeast has generally been recognized as safe by the U.S. Food and Drug Administration provided the level of 0.4 milligrams of folic acid per day is not exceeded. There are no legal barriers to the use of yeast in other countries.

Another problem solved by this process is palatability. Ordinarily, yeast has a sharp, pungent, salty taste. For this reason, if it is used as a protein supplement in many foods, such as cereals, simulated milk and grain, the natural flavor of the material to which the protein is added is substantially altered, the yeast taste coming through making the food undesirable. The present invention produces a bland, neutral-tasting yeast not readily discernible when mixed with other food, yet high in protein and safe.

There are no former methods of performing the function of the present invention. It is well known that losses of RNA occur upon injury to cells by drying conditions or exposure to certain adverse environmental factors. Irradiation and heating for one and a Japanese process for extracting RNA from cells for the purpose of utilizing the RNA resulted in cells which were not perfectly healthy and safe and palatable for human consumption. Thus, no method of optimizing the RNA and nucleic acid removal from cells and still keeping them edible existed until this discovery.

Therefore, an object of the present invention is to provide a yeast having minimal nucleic acid content.

Another object of the present invention is to provide a safe palatable high protein food source.

Another object of the present invention is to provide a process for removing nucleic acid from yeast.

Other objects, features and advantages of the present invention will be found from the following detailed specification when taken into consideration with the attached drawings of which:

EXAMPLE 1

Figure 1:
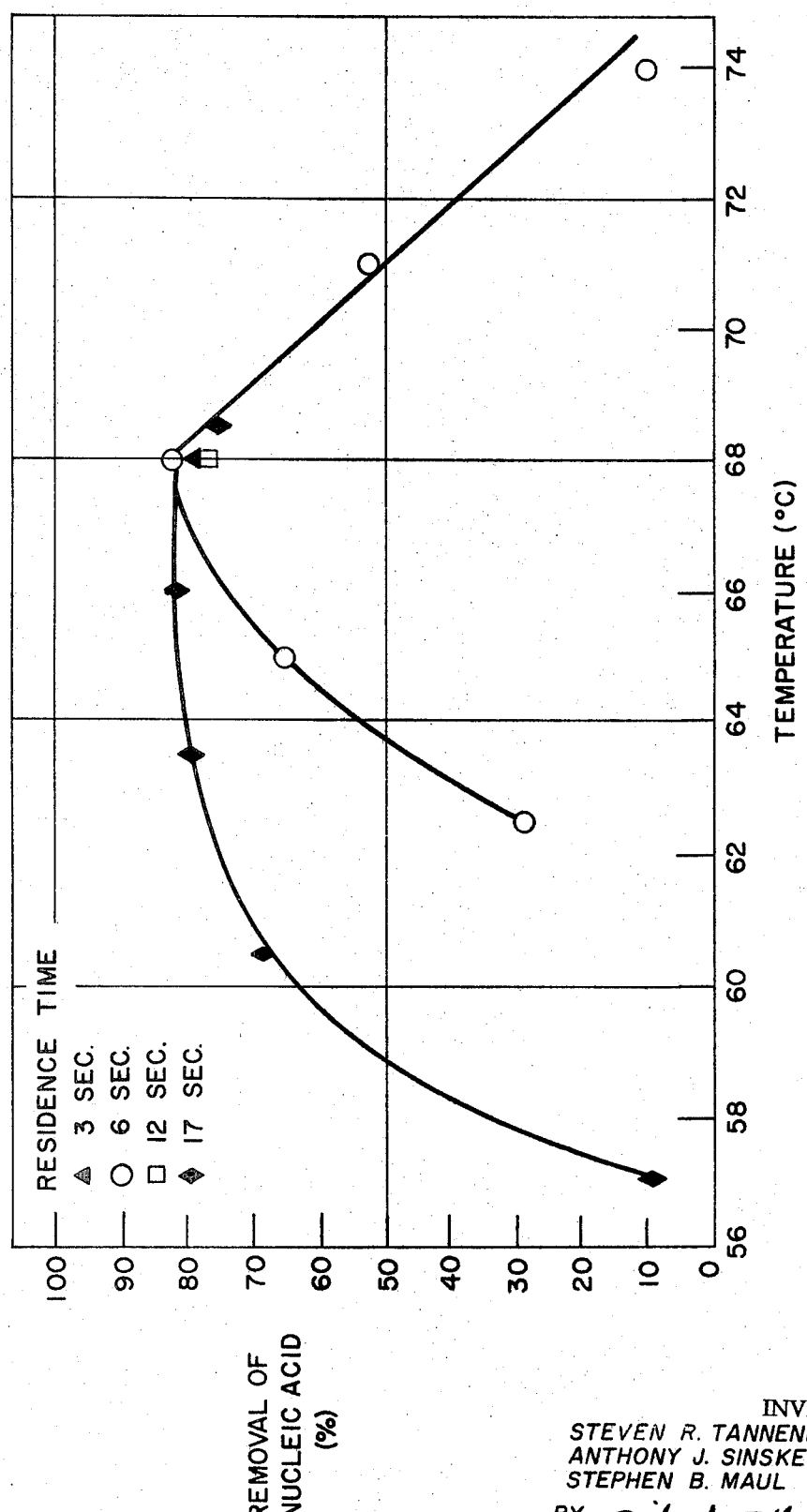
FIG. 1 is the effect of heat shock temperature and time on nucleic acid removal.

*Candida utilis* yeast was grown in continuous culture on the defined basil medium of Miller and Johnson with glucose as the carbon source and at a pH of 4 with a suitable nitrogen source such as ammonia. The initial nucleic acid content of the cells under these conditions was measured at approximately 7 percent. After collection, the cells are treated in accordance with the present invention.

The first step of heat shock was performed by passing a suspension of *Candida utilis* and spent medium through a 56 centimeter length of 1/32 inch stainless steel tubing, immersed in a vigorously stirring water bath at the specified temperature. In experiments designed to optimize the remaining steps, a nominal residence time of 5.5 to 6 seconds and a temperature of 68° C were chosen. Under these conditions, the bulk temperature of the cells is within 1°C of bath temperature after about 1 second in the heat exchanger. After heat shocking the cells were collected at 0°C or were treated immediately at 45°–50° C at a pH of 4 ½ to 7. The method of collection does not affect the final results. The remaining step was performed by heating 2 ml samples in 13 × 100 mm pyrex tubes for 10 minutes to infinity in a water bath at 50° to 60° C at a pH of 4 ½ to 7. After harvesting, the cells were washed once with water. The yeast cells now had a nucleic acid content of 1 to 1.5 percent and were approximately 50 percent protein, as opposed to the original 7 percent nucleic acid content. Moreover, the resulting yeast had a bland, neutral, highly palatable, soft taste.

It is not completely clear how the nucleic acid removal from cells comes about; however, a probable mechanism is:

The initial heat shock unfolds the nucleic acid molecules inside the cell; the ribonucleases and the deoxyribonucleases, the enzymes inside the cells break down these nucleic acids more easily since the structure of the nucleic acids is now unfolded and easily acted upon. The heat shock may also have activated these enzymes so as to make them more efficient in the breakdown of the nucleic acids. Heat shocking is conducted at a temperature between 60° C and 70° C for a period of from 2 to 20 seconds.

The inventors have discovered that a higher temperature for a shorter time does not work in this process. In all probability, the higher temperature creates a re-aggregation of the unfolded molecules of nucleic acid. A lower temperature for a longer period does not achieve the initial unfolding. Hence, the proper temperature range and time indicated in the first step was critical.

With the enzymes acting upon the nucleic acid, breaking them down into small structural units, these now smaller units, bases, (nucleocides and nucleotides of comparatively low molecular weight) can readily leak from the cells into the surrounding medium. Thus, in the incubation the cells sit at a comfortable temperature and the nucleic acid fragments having comparatively low molecular weight, permeate through the cell membrane and out of the cell.

It is important to note here that the process can be accelerated by adding or removing from the incubation media of Steps 2 and 3 certain ions well known to enhance the activity of ribonucleases and hence increase nucleic acid breakdown. Such ions are sodium, potassium, magnesium, calcium and manganese. The manner of adjusting the ions content is well known to those skilled in the art and will not be discussed further.

The advantages achieved over the former utilization of yeast as a protein source is the safety problem of nucleic acid breaking down to uric acid which human beings cannot readily metabolize. Reducing the content of nucleic acid in the cell is a marked advance over the prior art. Moreover, a neutral and bland-tasting yeast which can easily be added to foods without changing their natural flavor is a significant advance. The newly developed yeast according to the principle of the present invention offers human populations an inexpensive protein (up to 50 percent by weight) which may be used as a supplement to such foods as chocolate, vanilla and strawberry drinks, cereals, and many others, or as a primary protein source. The improved yeast need not utilize land in order to be grown. Other uses for this protein supplement would be in meat products, dairy products by way of an animal feed.

Referring now to the drawings, FIG. 1 shows two curves wherein Step 1 was varied while Step 2 was maintained at 45° C for 2 hours and in Step 3 the material was maintained at 55° C for 1 hour. The optimum temperature is shown to be 68° C with the residence time of 6 seconds for a maximal acid removal.

Figure 2:
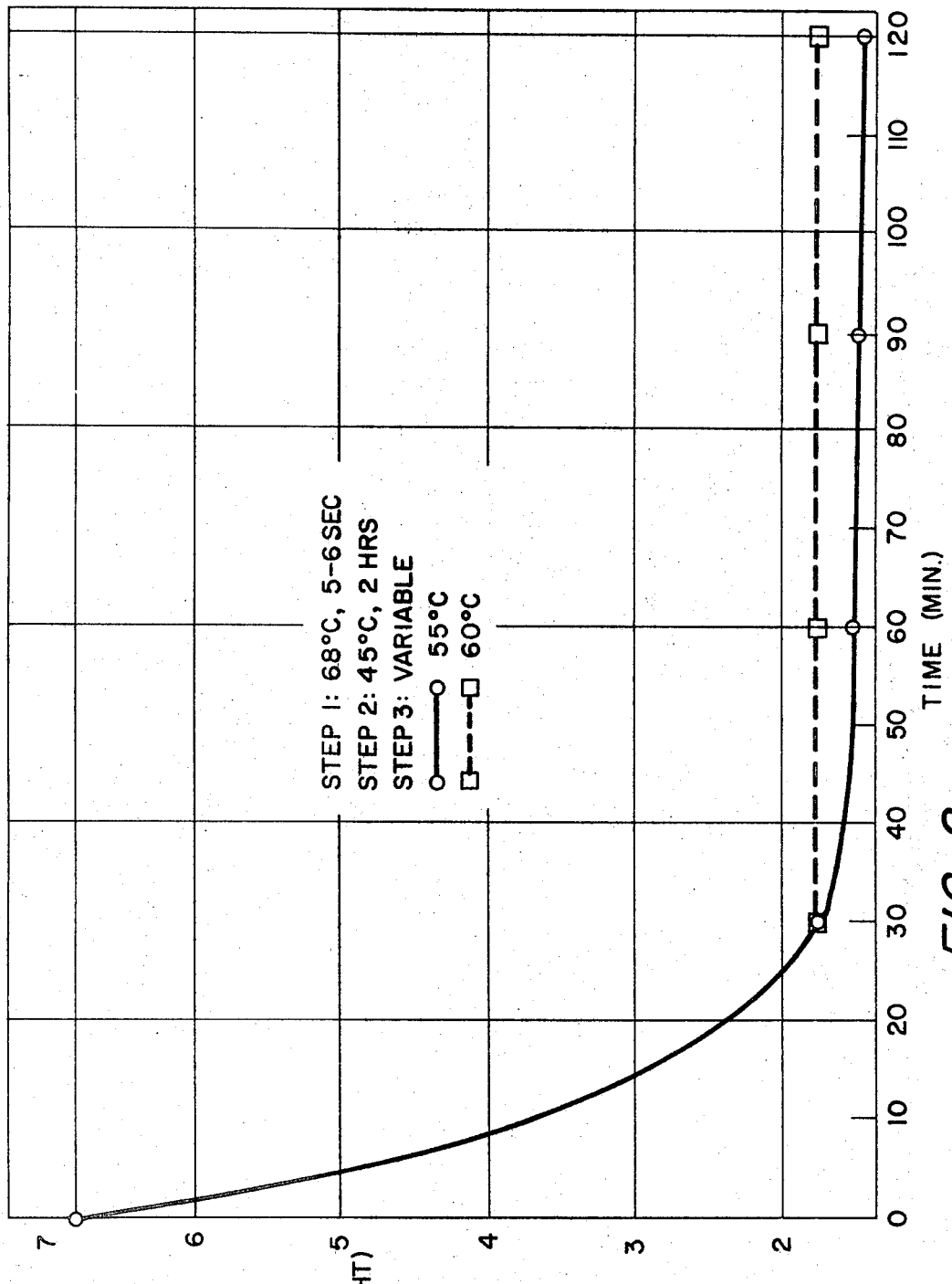
FIG. 2 is nucleic acid removal using 55° C and 60° C for this step.

FIG. 2 illustrates that increasing the temperature above 55° C increases the acid content over the same period of time.

Figure 3:
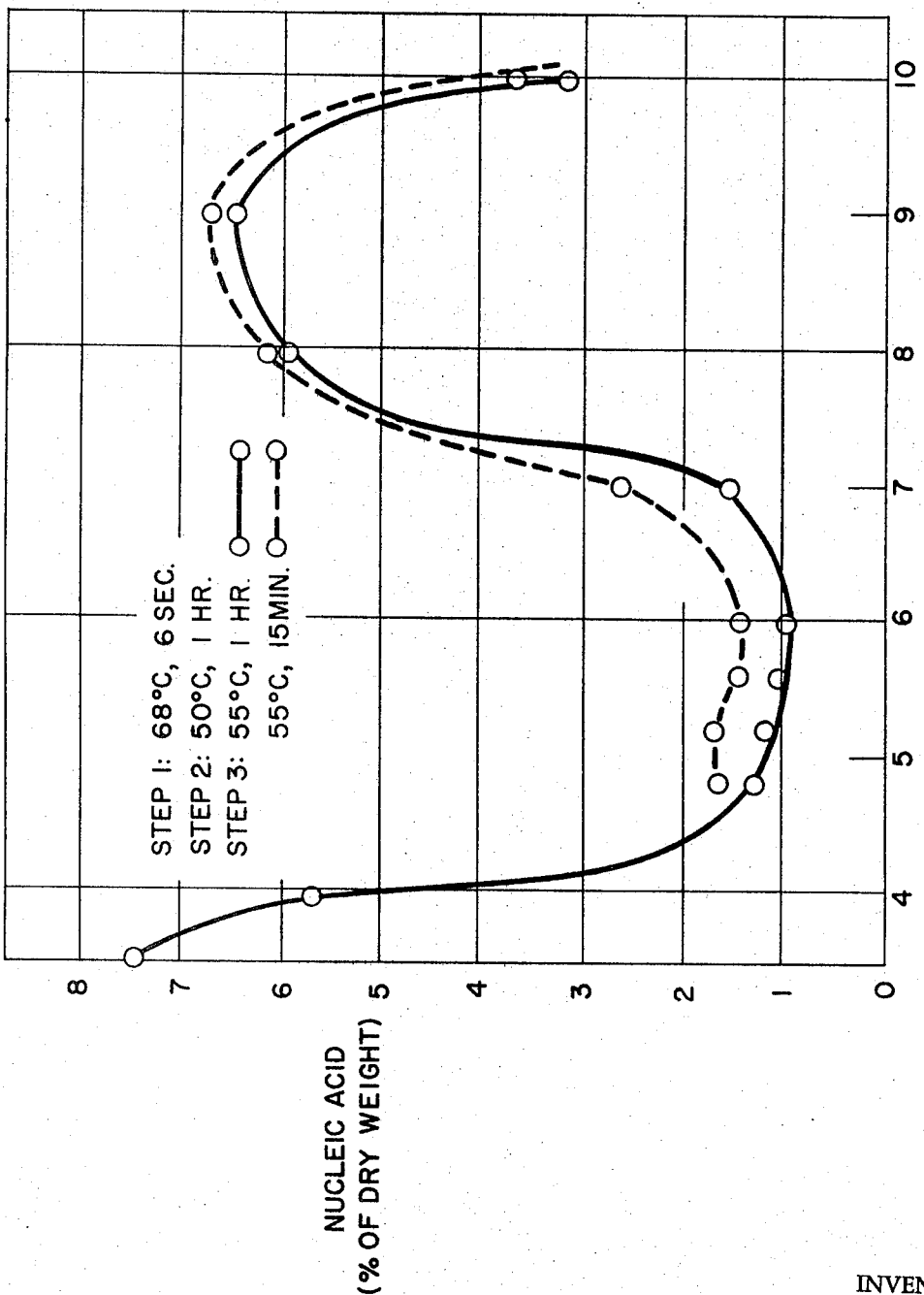
FIG. 3 is the effect of pH on nucleic acid removal.

FIG. 3 shows that the optimum pH is 6 for both the second and third steps.

EXAMPLE 2

First, an initial heat shock is applied as described above. Incubate the heat shocked substance above at a temperature of 50° to 55° C for 10 minutes to an infinitely long time. The most appreciable effects are achieved within an hour.

The results achieved by this two-step process are similar to those of the three-step process of Example 1. It is important to note that whether Steps 2 and 3 are combined into one step or kept separate, the pH of the incubation medium should be between 4 ½ and 7. On the other hand, the pH of Step 1 can be virtually any pH suitable to the growth medium.

There are many novel elements to this invention. The first is that in Step 1 of the process, the conditions for the first time were discovered which provided for subsequent leakage of nucleic acid fragments from the cells, yet allow the cell to remain intact. Steps 2 and 3 represent incubation which perpetuates the leakage. The process is highly attractive in that it readily changes yeast to a more palatable and better product without requiring extraneous chemicals and is a rather inexpensive process. In the present invention, the unicellular organisms are purged of a great portion of their nucleic acids while leaving those cells healthy and uncontaminated with extraneous chemicals. Hence, beyond yeast there will be broad applicability of this process to other unicellular organisms such as fungi and bacteria.

EXAMPLE 3

It is contemplated that Baker's yeast can be substituted in place of *Candida utilis* in Example 1.

EXAMPLE 4

It is contemplated that Baker's yeast can be substituted in place of *Candida utilis* in Example 2.

EXAMPLE 5

It is contemplated that Brewster's yeast can be substituted in place of *Candida utilis* in Example 1.

EXAMPLE 6

It is contemplated that Brewer's yeast can be substituted in place of *Candida utilis* in Example 2.

EXAMPLE 7

*Candida intermedia* was heat shocked as in Example 1 at 68° C for from 5 to 6 seconds. The temperature was then reduced in a single step to 52.5° C for incubation for from 2 to 3 hours in accordance with Steps 2 and 3 in said Example 1 above. The acid level of the material was thereby reduced from 7.5 percent to 8 percent dry weight to 1.5 percent dry weight.

Although we have disclosed our invention with reference to specific steps and materials, it is expected that those skilled in the art can make many substitutions and variations without departing from its true scope and spirit. Accordingly, we do not want to be limited thereby, but only in accordance with the appended claims.

What is claimed is:

1. The process of reducing the concentration of nucleic acid in a yeast selected from the group consisting of *Candida utilis* and *Candida intermedia* comprising the steps of:
   heat shocking said yeast, at a temperature between 60° C and 70° C for a period of time of from 2 to 20 seconds, and incubating said heat shocked yeast.

2. The process of reducing the nucleic acid content in yeast according to claim 1 wherein said incubating is accomplished by reducing the temperature of said heat shocked yeast to a temperature between 45° C and 50° C and maintaining said temperature for at least 20 minutes.

3. The process of reducing the nucleic acid content in yeast according to claim 2 wherein said incubating includes the further step of raising the temperature from 45° to 50° C to a temperature range between 50° C and 60° C and maintaining said temperature for at least 10 minutes.

4. The process of reducing the nucleic acid content in yeast according to claim 1 which further includes the step of maintaining the pH of the incubating yeast between about 4.5 and 7.

5. The process of reducing the nucleic acid content in yeast according to claim 1 wherein said incubating is accomplished by reducing the temperature of said heat shocked yeast to a temperature between 50° C to 60° C and maintaining said temperature for at least 30 minutes.

6. The process of reducing the nucleic acid content in yeast according to claim 1 which further includes the step of adjusting the ion content of the mixture by adding or removing ions selected from the group comprising sodium, potassium, magnesium, calcium and manganese.

7. The process of reducing the nucleic acid content in yeast according to claim 6 which further includes the step of washing the yeast cells with water.

8. The process of reducing the nucleic acid content in yeast according to claim 1 wherein said yeast is *Candida utilis*.

9. A process of reducing the nucleic acid content in *Candida intermedia* yeast comprising of the steps of:
  heat shocking said yeast at a temperature of approximately 68° C from 5 to 6 seconds, and
  incubating said heat shocked yeast at a temperature approximately 52.5° C for from 2 to 3 hours.

* * * * *